United States Patent [19]
Zalewski et al.

[11] Patent Number: 5,700,026
[45] Date of Patent: Dec. 23, 1997

[54] VEHICLE BODY LOWERING SYSTEM

[75] Inventors: Wojciech T. Zalewski, Belmont; Guy Steele, Shrewsbury, both of Mass.; Christopher J. MacKenzie, Chandler, Ariz.

[73] Assignee: Safe-T-Vans, Inc., Cambridge, Mass.

[21] Appl. No.: 745,296

[22] Filed: Nov. 8, 1996

Related U.S. Application Data

[63] Continuation-in-part of Ser. No. 387,474, Feb. 13, 1995, Pat. No. 5,573,266.

[51] Int. Cl.⁶ .......................................... B60G 11/26
[52] U.S. Cl. ................................ 280/704; 280/6.12
[58] Field of Search ................... 280/840, 6.1, 6.11, 280/6.12, 704; 254/418, 423, 426

[56] References Cited

U.S. PATENT DOCUMENTS

| | | | |
|---|---|---|---|
| 3,218,088 | 11/1965 | Nallinger et al. | 280/840 |
| 3,314,685 | 4/1967 | Bothwell | 280/840 |
| 3,871,465 | 3/1975 | Nichols | 180/24.02 |
| 4,213,625 | 7/1980 | Hagen | 280/43.23 |
| 4,763,953 | 8/1988 | Chalin | 298/175 |
| 4,958,584 | 9/1990 | Williamson | 114/270 |
| 5,306,038 | 4/1994 | Henderson, Jr. | 280/688 |

FOREIGN PATENT DOCUMENTS

| | | | |
|---|---|---|---|
| 4001601 | 7/1991 | Germany | 280/704 |
| 4039660 | 12/1991 | Germany | 280/704 |
| 279912 | 11/1988 | Japan | 280/704 |
| 2190335 | 11/1987 | United Kingdom | 280/840 |

*Primary Examiner*—Paul N. Dickson
*Attorney, Agent, or Firm*—Morse, Altman & Benson

[57] ABSTRACT

A vehicle body lowering system for installation in a motor vehicle having a wheeled carriage, a cargo/passenger compartment body, a door in the passenger compartment body for cargo loading and unloading or passenger embarking and debarking, and a spring suspension for the buoyant support of the body above the carriage between a lower position and an upper position. The components of the vehicle body lowering system include a hydraulic cylinder mounted within the body, a power source, a manually actuated control for energizing and deenergizing the power source, and an interconnection extending through the body between the cylinder and the carriage. The interconnection is characterized by an operative condition at which the body is in the lower position under the control of the power source, and an inoperative condition at which the body is freely subject to the buoyant support of the spring suspension.

20 Claims, 10 Drawing Sheets

VEHICLE BODY LOWERING SYSTEM

RELATED APPLICATIONS

This application is a continuation-in-part of U.S. patent application Ser. No. 08/387,474, filed on Feb. 13, 1995, now U.S. Pat. No. 5,573,266 and entitled VEHICLE BODY LOWERING SYSTEM.

BACKGROUND OF THE INVENTION

1. Field of the Invention

This invention relates to apparatus for accommodating cargo and disabled persons, and more particularly, to an apparatus for lowering the body of a motor vehicle to allow physically disabled persons to embark and debark comfortably and to allow cargo to be loaded and unloaded easily. The Americans with Disabilities Act (ADA) requires that, by Jan. 26, 1997, all public transportation, including taxis, hotel shuttles, etc., be equipped to accommodate physically disabled person, such as those confined to wheelchairs.

2. The Prior Art

Mechanical difficulties are inherent in providing access between the body of a motor vehicle and the street. Several solutions have been proposed.

These solutions often involve the use of ramps. One problem with a ramp is that the angle of incline of the ramp may be much too steep for carrying heavy cargo easily or for the average wheelchair to traverse easily. A solution to this problem is to modify the vehicle by permanently lowering the vehicle floor. In this case, the ramp traverses the reduced height between the ground and the floor of the vehicle. However, problems arise with this solution. First, the modifications in the vehicle construction necessary to lower the floor of a motor vehicle are substantial. Many components of the vehicle must be repositioned, the existing floor must be removed, and a new floor installed. The time and effort involved are substantial and costly. Also, such redesign involves issues of safety. For example, in some vehicle models, the fuel tank must be relocated. Since the automotive manufacturers locate fuel tanks to be as protected as possible during collisions, moving the fuel tank may make it more susceptible to damage during a collision.

Another safety issue is involved in lowering the floor of the vehicle. Because the floor is permanently lowered, it is more susceptible to "bottoming out," where the bottom of the vehicle floor hits the road when going over bumps and potholes. This factor can lead to vehicle control problems, as well as a reduction in the maximum load that the vehicle can safely carry. A further safety issue involves the integrity of the vehicle body itself. Many vehicles are designed without a heavy frame on which to mount the body components. They rely instead on the combination of the body components themselves to give structure to the body (the "unibody" construction). The integrity of the unibody may be compromised by removing and replacing a substantial portion of the vehicle floor. The vehicle body may tend to become more susceptible to collapse because it no longer conforms precisely to the manufacturer's design.

An alternative solution is to install a special suspension system by which the body may be lowered. Typically, this type of system may consist of suspension devices that are inflated or deflated by air to raise or lower the floor of the vehicle. The main drawback of a special suspension system is the necessity of replacing or substantially modifying the original factory-installed suspension system, thereby increasing cost and complexity.

Thus, there continues to be a need for a system for lowering the floor of a vehicle to permit a load to ingress and egress easily and comfortably that can overcome the above-described drawbacks of the prior art.

SUMMARY OF THE INVENTION

The object of the present invention is to provide an apparatus for lowering the body of a vehicle so that a load can ingress and egress easily and comfortably while requiring no modification to the body or to the existing spring suspension of the vehicle, thus needing a minimum of time and effort to install and retaining the integrity and safety of the vehicle. The load can be cargo and/or persons, typically physically disabled persons.

The vehicle body lowering system of the present invention is installed in a motor vehicle having a wheeled carriage, a load compartment body, a door in the body for ingress and egress of a load, and a spring suspension for the buoyant support of the body above the carriage between a lower position and an upper position. The components of the vehicle body lowering system include a drive for forcing the body into the lower position, where the drive comprises a power source and an interconnection between the body and the carriage, and a manually actuated control for energizing and deenergizing the power source. The interconnection is characterized by an operative condition at which the body is in the lower position under the control of the power source and an inoperative condition at which the body is freely subject to the buoyant support of the spring suspension. The interconnection has at least one coupling to the body and at least one coupling to the carriage.

In the preferred embodiment, the interconnection includes a plurality of hydraulic cylinders attached between the body and the carriage such that when the hydraulic cylinders are activated, the body is drawn toward the carriage, compressing the spring suspension, thus causing the vehicle body to lower toward the ground. The power source includes a hydraulic fluid reservoir, a hydraulic pump, a hydraulic line between the reservoir and the pump, and a line between the pump and each of the hydraulic cylinders.

In an alternative embodiment, the hydraulic cylinders are replaced by electric motors attached between the body and the carriage such that when the motors are activated, the body is drawn toward the carriage, compressing the spring suspension, thus causing the vehicle body to lower toward the ground. The power source can be integrated into the electrical system of the vehicle and include the vehicle battery, alternator, and electrical wiring.

There are five preferred embodiments of the present invention. In the first embodiment, a hydraulic cylinder is permanently mounted within the body. A line runs from the cylinder piston, around a pulley, through an opening in the vehicle floor, and attaches to the axle housing near one of the wheels. In the second embodiment, a hydraulic cylinder is slidably mounted within the body. Two lines run from the cylinder, one from the piston and one from the end of the cylinder body. Each line is routed around a pulley, through an opening in the vehicle floor, and attaches to the axle housing near one of the wheels. In the third embodiment, two cylinders are mounted side-by-side, perpendicular to the axle housing, near the center line of the vehicle. A line runs from each cylinder piston, around a pulley, through an opening in the vehicle floor, and attaches to a bar. The bar is parallel to the axle housing and is attached to the axle housing near each wheel. Preferably, in the above three embodiments, the line is a steel chain and the pulley is a toothed sprocket.

In the fourth embodiment, the cylinder is mounted below the body floor, approximately vertically, and so that it can swivel. A rigid rod extends from the piston through an aperture on the axle housing. A plate or ball at the end of the rod prevents it from being pulled through the aperture. In the fifth embodiment, the cylinder is mounted below the body floor, approximately vertically. A line, preferably a steel chain, extends from the piston to the axle housing. Alternatively, a rigid rod is attached to the axle housing and the line extends between the piston and the rod, preventing the line from being entangled in the vehicle's moving parts.

Preferably, for all of the embodiments, the length of each line is such that it is nearly fully extended when the cylinder and the wheel's suspension are fully extended. The pulling power of each cylinder is at least enough to fully compress the wheel's suspension when the cylinder is activated. The displacement the cylinder is at least enough to fully compress the wheel's spring suspension from a fully extended position.

The manually actuated control includes an electrical switch and control circuitry. In one embodiment, the switch is directly wired to the control circuitry and located inside the body. In another embodiment, the switch is a remote control device, with the transmitter held by the operator and the receiver directly wired to the control circuitry and located in the vehicle. The control circuitry includes a number of optional safety features, including (1) prohibiting the energizing of the power source unless the switch is manually actuated continuously during the transition from the inoperative condition to the operative condition, (2) prohibiting the energizing of the power source unless the door is open, and (3) in a motor vehicle with an automatic transmission, prohibiting the energizing of the power source unless the automatic transmission is in the "park" or "neutral" position. If the operator fails to maintain the switch in the "on" position, the system will discontinue lowering the vehicle body. If the door is closed when the vehicle body is in a lowered position, the vehicle body lowering system will deactivate, causing the vehicle to resume its normal driving position.

Other objects of the present invention will in part be obvious and will in part appear hereinafter.

BRIEF DESCRIPTION OF THE DRAWINGS

For a fuller understanding of the nature and object of the present invention, reference is made to the accompanying drawings, wherein.

DETAILED DESCRIPTION OF THE PREFERRED EMBODIMENT

The Vehicle Environment of FIGS. 1 to 7

Figure 1:
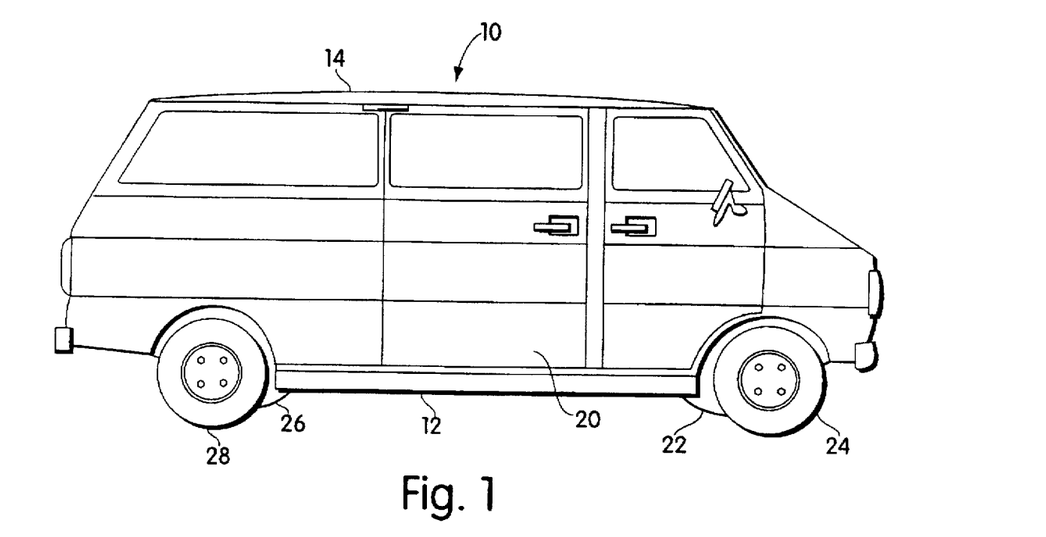
FIG. 1 is a view in profile of a typical mini-van vehicle for carrying cargo or passengers.
Figure 2:
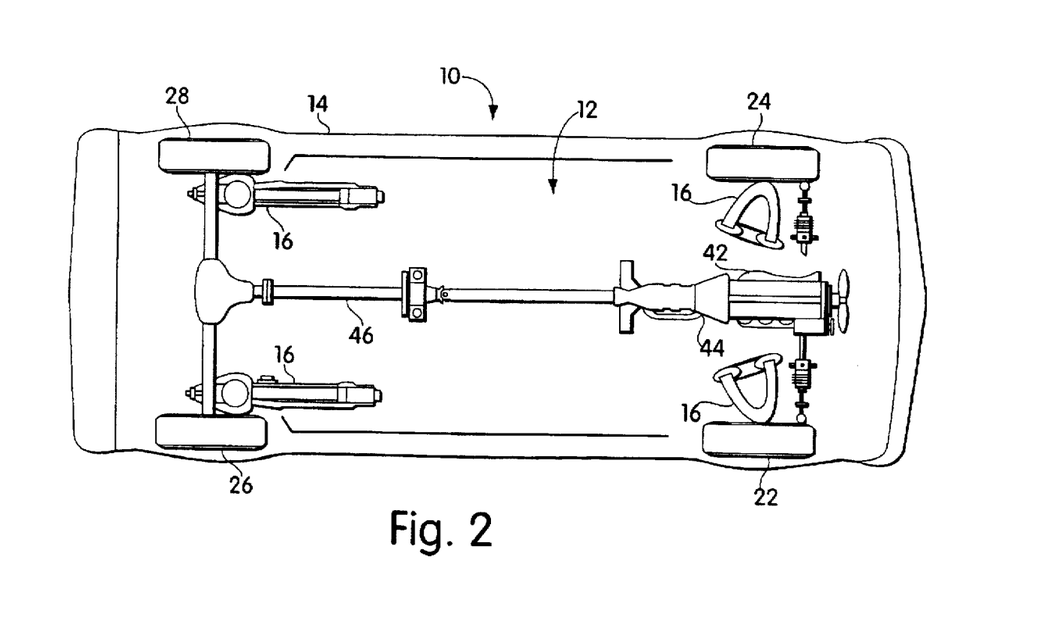
FIG. 2 is a bottom view of the vehicle of FIG. 1.

FIGS. 1 and 2 show a profile and a bottom view of a typical motor vehicle 10: a van used to transport cargo or several passengers. The typical vehicle has a carriage 12, a body 14, and a suspension system 16 that buoyantly supports the body over the carriage 12.

Figure 3:
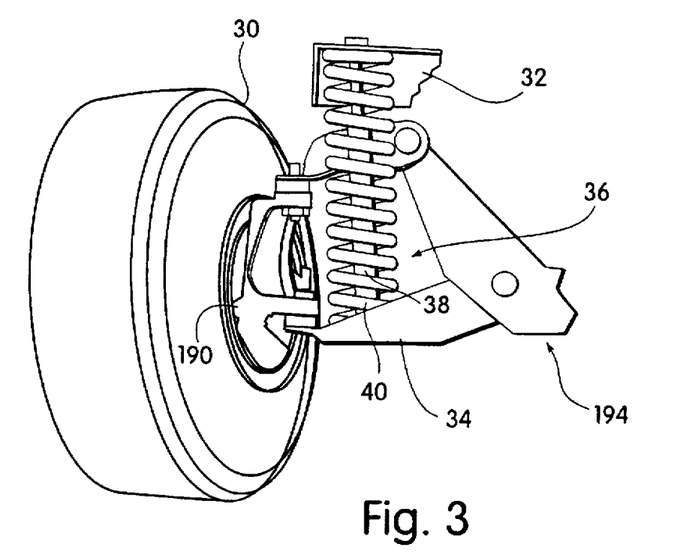
FIG. 3 is a view in relief of a front suspension component of the vehicle of FIG. 1.
Figure 4:
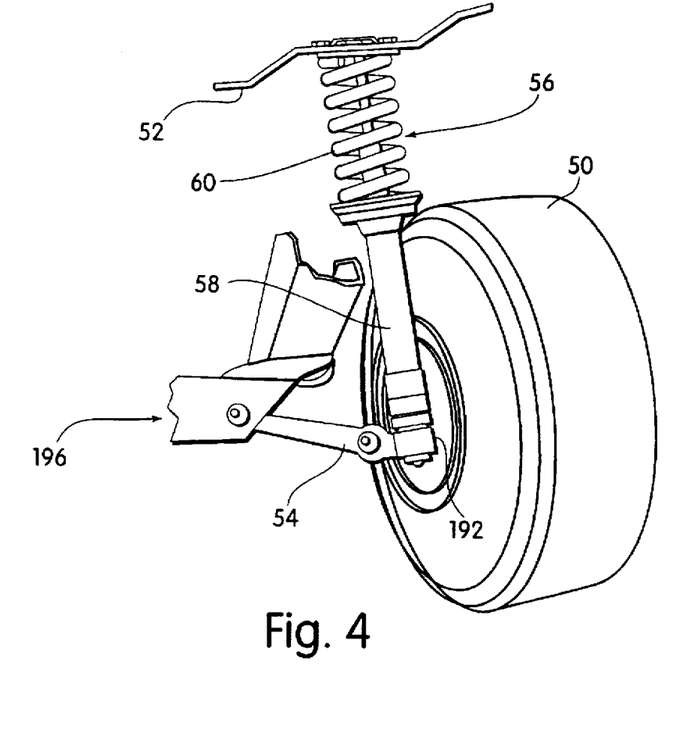
FIG. 4 is a view in relief of an alternate front suspension component of the vehicle of FIG. 1.

FIGS. 2 to 7 illustrate several different combinations of carriages, bodies, and suspension systems. FIGS. 3 and 4, show two different front wheel arrangements for a rear-wheel drive vehicle. Each of the front wheels 30, 50 is rotationally and pivotally attached, as at 190, 192, to the end of a control arm 34, 54. The component of the suspension system for each front wheel 36, 56 is connected between the corresponding control arm 34, 54 and the underside of the body of the vehicle 32, 52.

Figure 5:
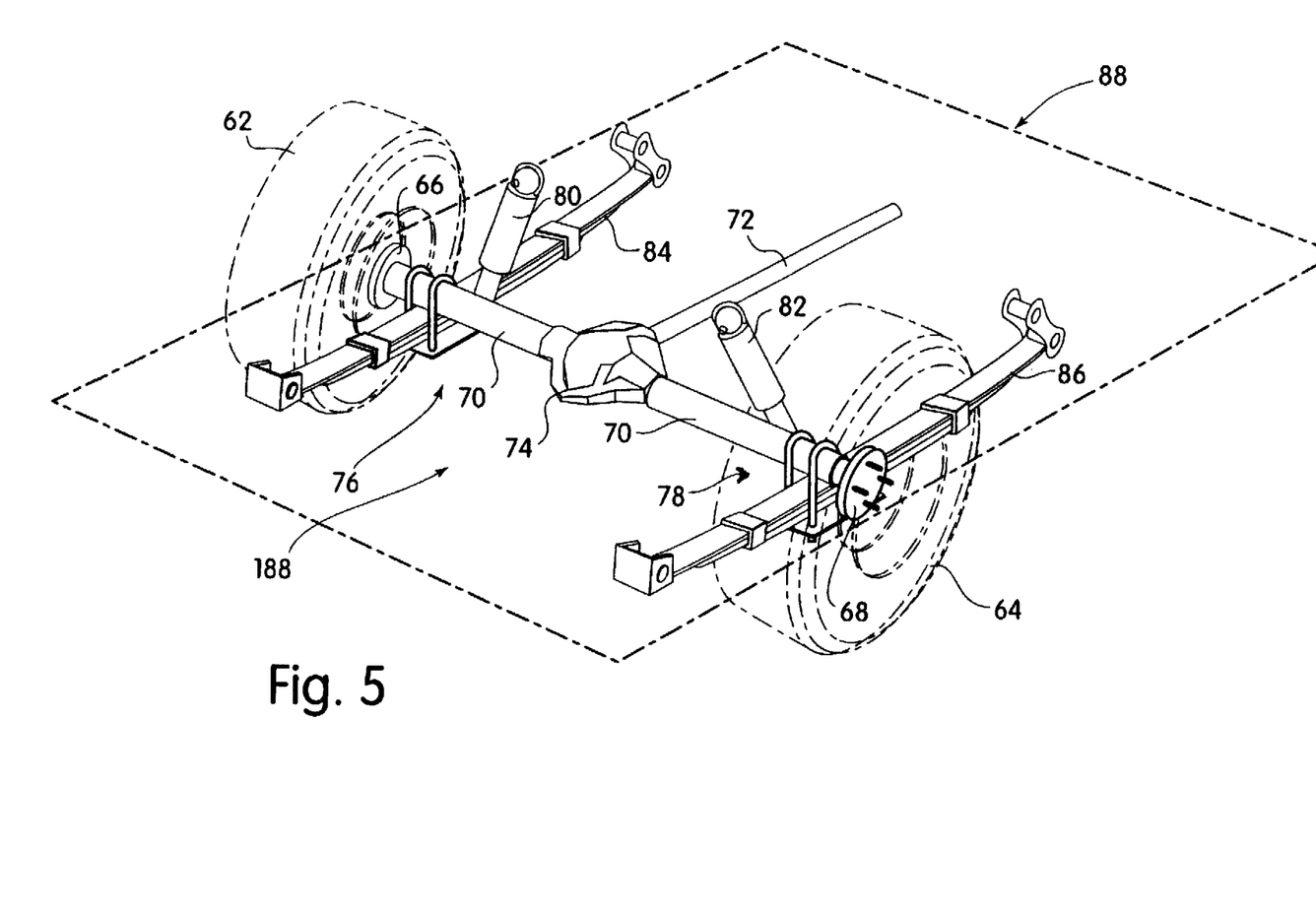
FIG. 5 is a view in relief of a rear suspension of the vehicle of FIG. 1.

As illustrated in FIG. 5, The rear of the rear-wheel drive vehicle typically has two axles 66, 68, one for each wheel 62, 64. The wheel 62, 64 is at one end of an axle 66, 68 and the other end of both axles terminates within the differential 74, the mechanism that transfers the power from the vehicle motor drive shaft 72 to the axles 66, 68 and wheels 62, 64. Surrounding and protecting the axles 66, 68 and differential 74 is the rear axle housing 70. The component of the suspension system for each rear wheel 76, 78 is connected between the rear axle housing 70 near the wheel 62, 64 and the underside of the body of the vehicle 88.

Figure 6:
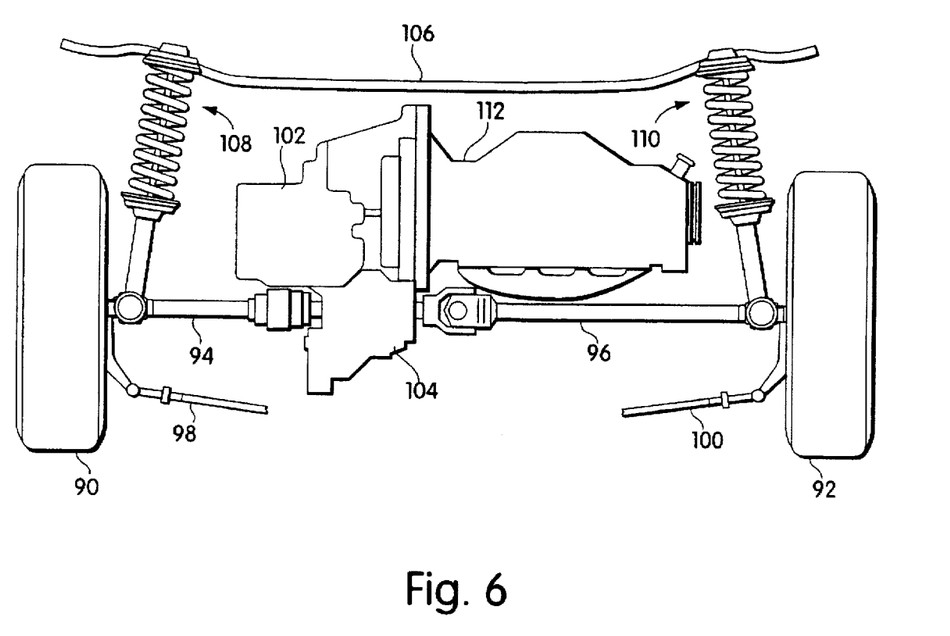
FIG. 6 is a view in relief of the front suspension of a typical front-wheel-drive vehicle.
Figure 7:
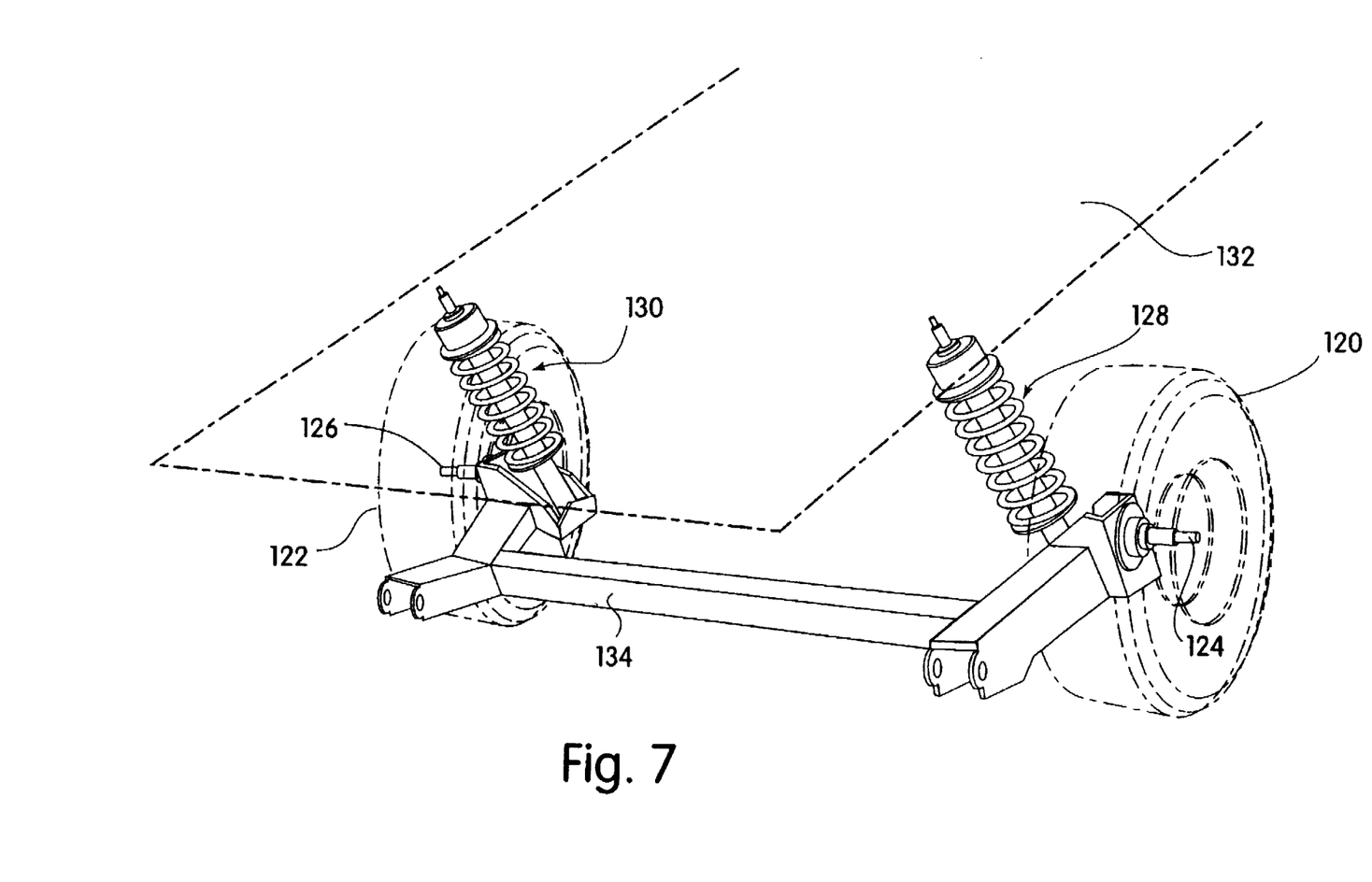
FIG. 7 is a view in relief of the rear suspension of a front-wheel-drive vehicle.

In the typical front-wheel-drive vehicle, the front has a structure similar to the front of a rear-wheel-drive vehicle As illustrated in FIG. 6, each of the front wheels 90, 92 is rotationally and pivotally attached to the end of a control arm 98, 100. The component of the suspension system for each front wheel 108, 110 is connected between the corresponding control arm 98, 100 and the underside of the body of the vehicle 106. In addition, there are two axles 94, 96 terminating in a differential 104 and at the wheels 90, 92. The differential 104 transfers power from the engine 112 and transmission 102 to the axles 94, 96 and the wheels 90, 92. One typical rear structure of a front-wheel-drive vehicle is shown in FIG. 7. The rear wheels 120, 122 are rotationally attached to spindles 124, 126 at the ends of a support beam 134. The suspension components 128, 130 connect between the support beam 134 and the underside of the body 132.

In the third combination, the typical four-wheel-drive vehicle, the rear has a structure very similar to the rear of a rear-wheel-drive vehicle illustrated in FIG. 5, and the front of a four-wheel-drive vehicle is very similar in structure to the rear of the vehicle.

In order to refer generically to the various carriage structures available in today's vehicles, this specification will use the generic terms defined in Table 1 for various components of the carriage.

TABLE 1

| Generic term | Rear-wheel-drive vehicle | Front-wheel-drive vehicle | Four-wheel-drive vehicle |
| --- | --- | --- | --- |
| Front axle | The combined front rotational attachments. | The combined front axles. | The combined front axles. |
| Front axle housing | The combined control arms. | The combined control arms. | The front axle housing. |
| Rear axle | The combined rear axles. | The combined rear rotational attachments. | The combined rear axles. |
| Rear axle housing | The rear axle housing. | The rear support beam. | The rear axle housing. |

The body 14 of the vehicle is occupied by the cargo and/or passengers being transported by the vehicle 10. To get in and out of the body, a door 20 is shown. In one alternative embodiment, the door slides, as in, for example, the side door of the typical van. In another alternative embodiment, the door is hinged, as in, for example, the driver's door of the typical passenger automobile.

A suspension system has four assemblies, one for each wheel. As illustrated in FIGS. 3–5, an assembly includes a spring 40, 60, 84, 86 and a shock absorber 38, 58, 80, 82. The spring isolates the body of the vehicle from the effects of the road on the carriage and the shock absorber limits the reaction time of the spring to sudden changes in the road surface. The combination of the spring and shock absorber give the cargo and passengers a smoother ride.

There are two types of springs, the coil spring 40, 60 and the leaf spring 84, 86. FIG. 3 shows one configuration in which the coil spring 40 is mounted in relation to the carriage 194, the body 32, and the shock absorber 38 when the spring 40 and shock absorber 38 are separate units. In this configuration, the shock absorber 38 is mounted inside and parallel with the spring 40. FIG. 4 shows how the coil spring 60 is mounted in relation to the carriage 196, the body 52, and the shock absorber 58 in a strut configuration. FIG. 5 shows how the leaf spring 84, 86 is mounted in relation to the carriage 188, the body 88, and the shock absorber 80, 82.

The Present Invention

In its preferred embodiment, the vehicle body lowering system of the present invention includes a plurality of hydraulic cylinders connected between the carriage and the body, a power source, and a manually actuated control for energizing and deenergizing the power source.

In the preferred embodiment, the vehicle body lowering system uses hydraulic cylinders to substantially fully compress the suspension system of the vehicle, putting the system into its operative state. The system is in its inoperative state when the vehicle lowering system has essentially no effect on the normal operation of the motor vehicle and the suspension system operates normally.

In an alternative embodiment, electric motors are used in place of the hydraulic cylinders.

As shown in FIGS. 8–13, there are several preferred embodiments of the present invention. Each embodiment uses hydraulic cylinders to compress the suspension system. The preferred hydraulic cylinder has two states, its quiescent state, where the piston is extended out of the cylinder body, and its activated state, where the piston is retracted into the cylinder body.

Figure 8:
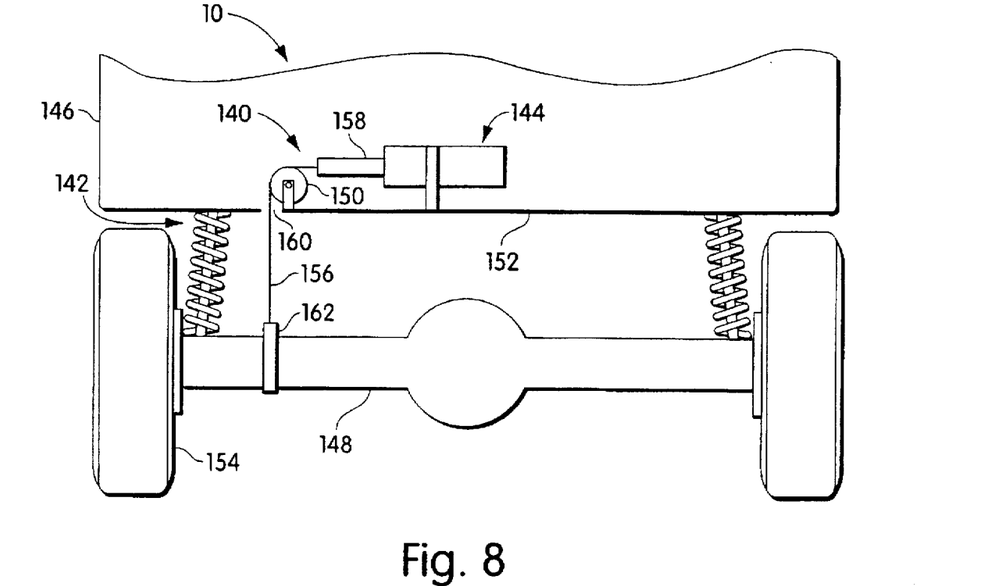
FIG. 8 is an elevational view of a first embodiment of the present invention.

The Assembly of FIG. 8

FIG. 8 illustrates the first embodiment assembly 140, typically used on the rear of a vehicle 10. The assembly 140 operates on one suspension component 142, which can be associated with any wheel. A hydraulic cylinder 144 is permanently mounted within the vehicle body 146. The orientation of the cylinder 144 is shown in FIG. 8 as being horizontal and parallel to the rear axle housing 148, but all angles of orientation within the body 146 are contemplated, including perpendicular to the axle housing 148 or vertical. A pulley 150 is rotationally mounted to the body floor 152 directly above the axle housing 148 at a point near the wheel 154. The pulley 150 is mounted so that its axis of rotation is substantially perpendicular to the horizontal orientation of the cylinder 144. In the typical vehicle, the body floor is a relatively thin sheet metal that will not withstand the forces required to compress the suspension components, especially at the pulley. When this is the case, a reinforcing plate should be used so that the body floor does not have to absorb the force of the pull of the cylinder by the pulley.

The end of a flexible, constant length line 156 is fastened to the end of the piston 158 of the cylinder 144. The line 156 is routed around the pulley 150, through an opening 160 in the body floor 152, and permanently fastened to the axle housing 148, as at 162, approximately below the pulley 150. In the preferred embodiment, the line 156 is a steel link chain, the pulley 150 is a toothed sprocket, and the length of the line 156 is such that it is substantially completely extended when the cylinder 144 and the suspension component 142 are fully extended. The power and displacement of the cylinder 144 is at least enough to compress the suspension component 142 substantially completely from a fully extended position.

If the cylinder 144 is substantially vertical, there is no need for a pulley 150 to direct the line 156. The line 156 merely extends straight through the opening 160 in the body floor 152.

Figure 9:
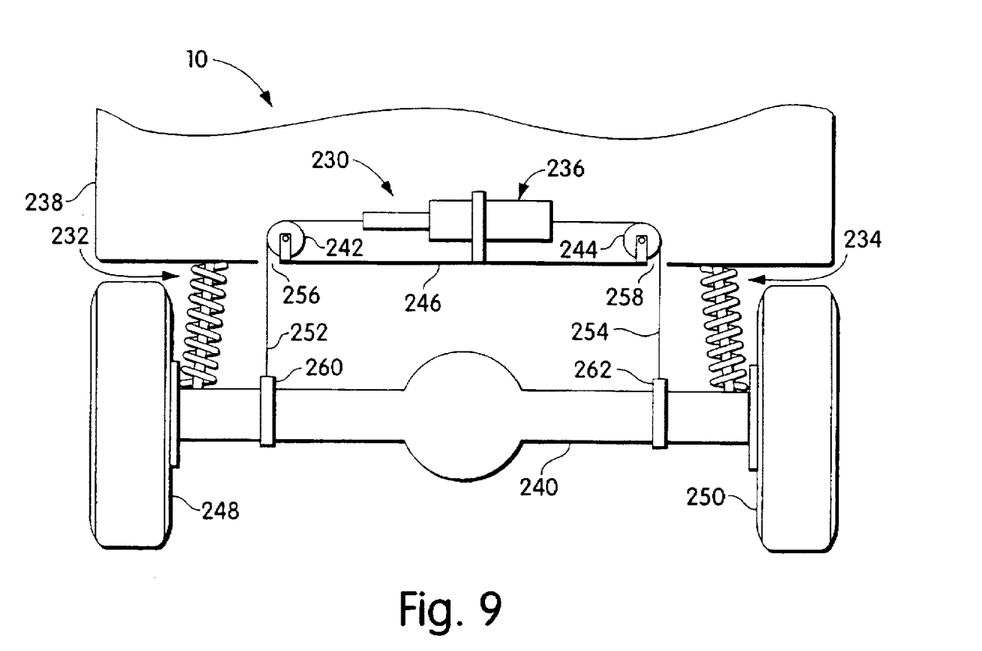
FIG. 9 is an elevational view of a second embodiment of the present invention.

The Assembly of FIG. 9

FIG. 9 illustrates the second embodiment assembly 140, typically used on the rear of a vehicle 10. The assembly 230 operates on both suspension components 232, 234. The hydraulic cylinder 236 is slidably mounted within the vehicle body 238, substantially parallel to the axle housing 240. A pair of pulleys 242, 244 are rotationally mounted to the body floor 246 directly above the axle housing 240, one above a point on the axle housing 240 near the left wheel 248 and one above a point on the axle housing 240 near the right wheel 250. The pulleys 242, 244 are mounted so that their axes of rotation are substantially perpendicular to the axle housing 240 and substantially perpendicular to the plane of motion of the vehicle 10. As described above in reference to the first embodiment, a reinforcing plate should be used so that the body floor does not have to absorb the force of the pull of the cylinder by the pulleys.

The end of a flexible, constant length line 252, 254 is fastened to each end of the cylinder 236. Each line 252, 254 is routed around one of the pulleys 242, 244 at approximately a 90° angle, through an opening 256, 258 in the floor 246, and permanently fastened to the axle housing 240, as at 260, 262, approximately below the corresponding pulley 242, 244. In the preferred embodiment, the lines 252, 254 are steel link chains, the pulleys 242, 244 are toothed sprockets, and the lengths of the lines 252, 254 are such that they are substantially completely extended when the cylinder 236 and both suspension components 232, 234 are fully extended. The power and displacement of the cylinder 236 is at least enough to substantially fully compress both rear suspension components 232, 234 from a fully extended position.

Figure 10:
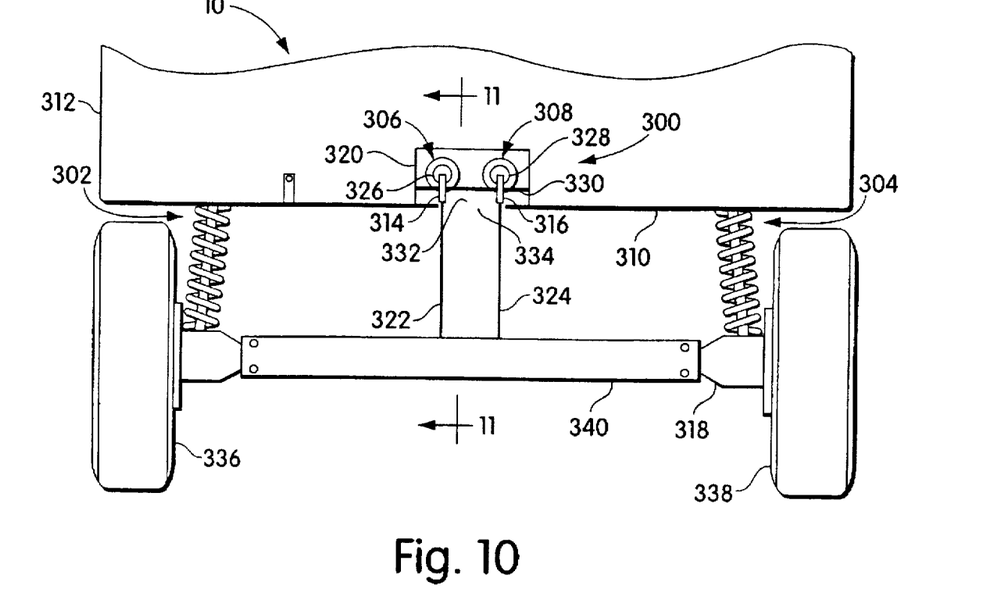
FIG. 10 is an elevational view of a third embodiment of the present invention.
Figure 11:
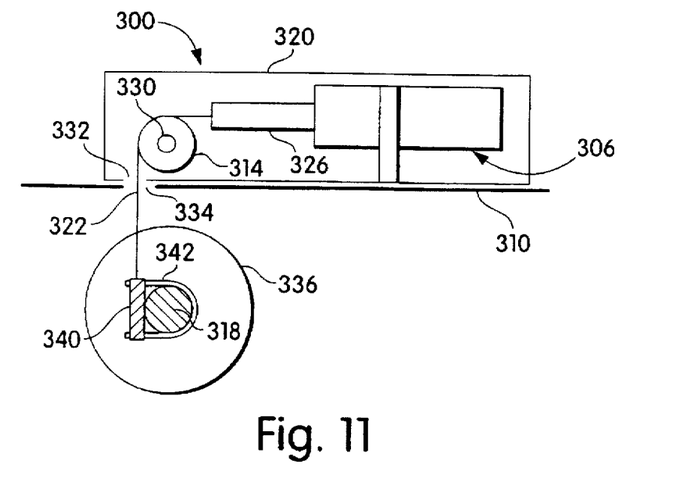
FIG. 11 is a cross-sectional view of the embodiment of FIG. 10 along the line 11—11.

The Assembly of FIGS. 10–11

FIGS. 10–11 illustrate the third and most preferred embodiment assembly 300 as it is used in the rear of a vehicle 10. The assembly 300 operates on both rear suspension components 302, 304. A pair of hydraulic cylinders 306, 308 are permanently mounted within the body 312. The cylinders 306, 308 are preferably horizontal and perpendicular to the rear axle housing 318. A pair of pulleys 314, 316 are rotationally mounted to the body floor 310 approximately above the rear axle housing 318. The pulleys 314, 316 are mounted so that their axes of rotation, as at 330, are substantially coincident, substantially parallel to the rear axle housing 318, and substantially perpendicular to the plane of motion of the vehicle 10.

As described above in reference to the first embodiment, in the typical vehicle, the body floor is a relatively thin sheet metal that will not withstand the forces required to compress the suspension components, especially at the pulleys. A reinforcing plate, as described above with reference to the first two embodiments may be used. However, in this embodiment, the cylinders 306, 308 and pulleys 314, 316 are preferably housed in a box 320. In addition to providing strong support for the assembly components, the box 320 makes retrofitting an existing vehicle much easier; the components do not have to be mounted in the vehicle body individually, only the box 320 must be mounted. In order to keep the box 320 as small as is practical, the cylinders 306, 308 are preferably kept in close proximity to each other. This also reduces the distance that the hydraulic lines must run between the cylinders 306, 308.

The end of a flexible, constant length line 322, 324 is fastened to the end of the piston 326, 328 of both cylinders 306, 308. The lines 322, 324 are routed around their corresponding pulley 314, 316, through an opening 332 in the box 320 and an opening 334 in the body floor 310, and permanently fastened to the rear axle housing 318. The attachment to the axle housing 318 is different than that of the first two embodiments. Because the cylinders 306, 308 and pulleys 314, 316 are close together, they cannot directly pull near the wheels 336, 338, where the least amount of power is needed to compress the suspension components 302, 304. To solve this problem, a bar 340 is mounted, via U-bolts 342, to the axle housing 318. The ends of the bar 340 are as close to the wheels 336, 338 as practical in order to keep the power needed from the cylinders 306, 308 as low as possible, reducing the cost of the cylinders 306, 308. In addition, with this bar arrangement, if one of the cylinders should fail to operate, both suspension components 302, 304 can still be at least partially compressed by the operational cylinder.

Preferably, the lines 322, 324 are steel link chains, the pulleys 314, 316 are toothed sprockets, and the length of the lines 322, 324 are such that they are substantially completely extended when the cylinders 306, 308 and suspension components 302, 304 are fully extended. The power and displacement of the cylinders 306, 308 are at least enough to compress the suspension components 302, 304 substantially completely from a fully extended position.

Figure 12:
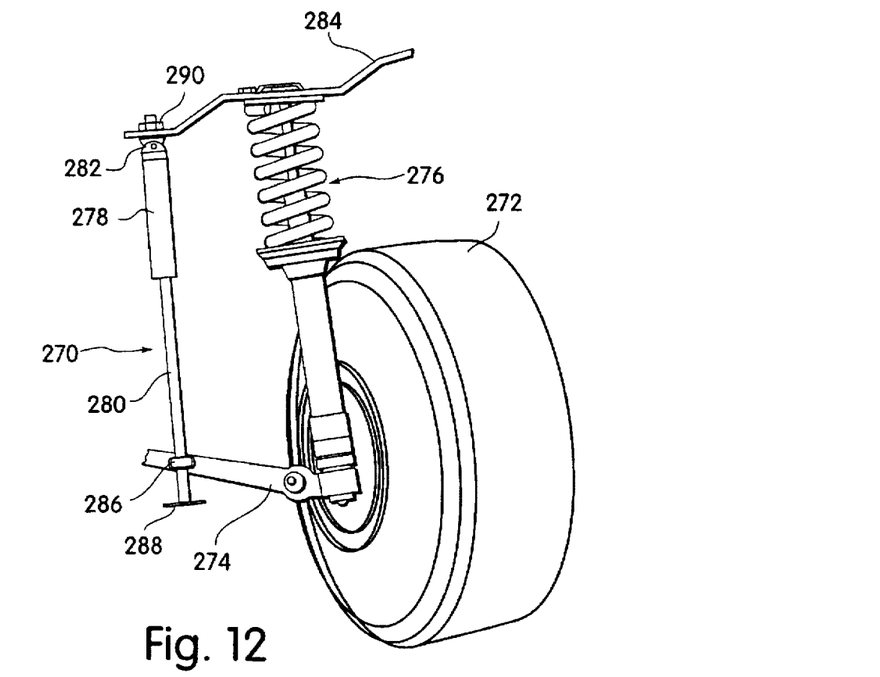
FIG. 12 is an elevational view of a fourth embodiment of the present invention.

The Assembly of FIG. 12

FIG. 12 shows the fourth assembly configuration 270, which is typically used for the front of a vehicle 10, but may be used for the rear of a vehicle 10. This assembly 270 operates on one suspension component 276. The upper end of a hydraulic cylinder 278 is mounted by a universal joint 282 to the underside of the body 284 so that the cylinder 278 can swivel about the mounting 290. The piston 280 of the cylinder 278 extends through an opening 286 in the control arm 274 and is terminated by a plate 288, or a ball, which is larger than the opening 286, thus precluding the end of the piston 280 from retracting through the opening 286. In the preferred embodiment, the length of the piston 280 is such that the end plate 288 is nearly in contact with the rim of the opening 286 when cylinder 278 and the suspension component are fully extended. The power and displacement of the cylinder 278 is at least enough to compress the suspension component 276 substantially completely from a fully extended position.

Figure 13:
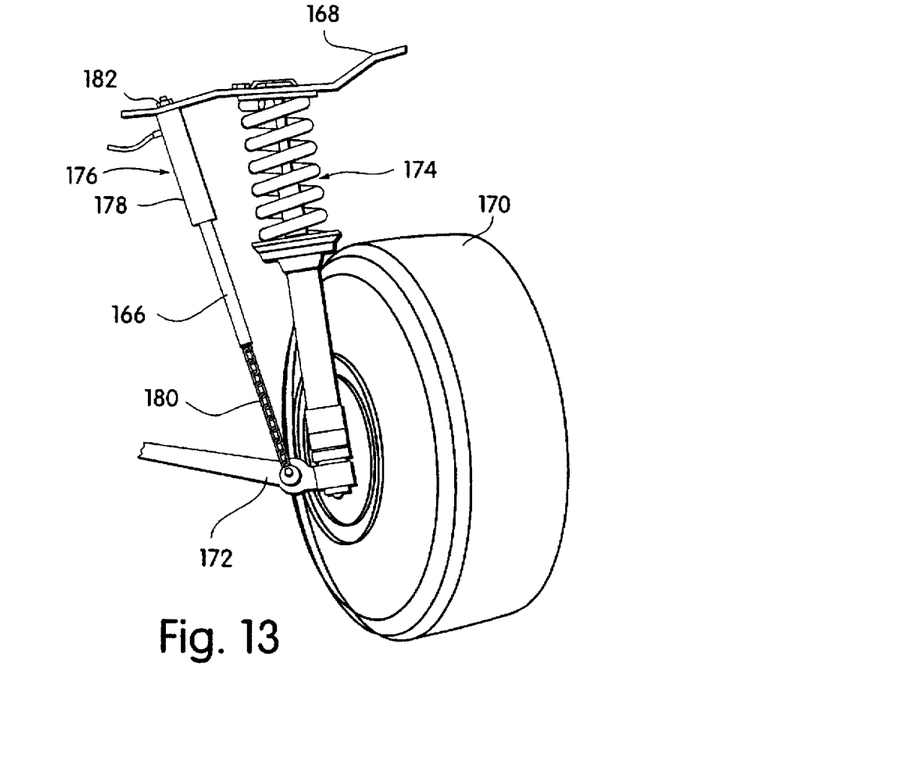
FIG. 13 is an elevational view of a fifth embodiment of the present invention.

The Assembly of FIG. 13

FIG. 13 shows the fifth assembly configuration 176, which is typically used for the front of a vehicle 10, but may be used for the rear of a vehicle 10. This assembly 176 operates on one suspension component 174. The upper end of a hydraulic cylinder 178 is mounted to the underside of the body 168 at 182 so that the cylinder 178 is no more than 45° from vertical. The end of the cylinder piston 166 is suspended above the control arm 172 near a front wheel 170 and remains above the control arm 172 when the suspension component 174 is fully compressed. A flexible, constant length line 180 connects the end of the piston 166 to the control arm 172 near the wheel 170. In the preferred embodiment, the line 180 is a steel chain and the length of the line 180 is such that it is substantially completely extended when the cylinder 178 and the suspension component 174 are fully extended. Alternatively, the lower end of the line at the control arm 172 is replaced by a rigid rod. The rod keeps the flexible line away from the moving components of the suspension 174 and wheel 170 in order to prevent the line from hindering the operation of the vehicle. The power and displacement of the cylinder 178 is at least enough to compress the suspension component 174 substantially completely from a fully extended position.

Figure 14:
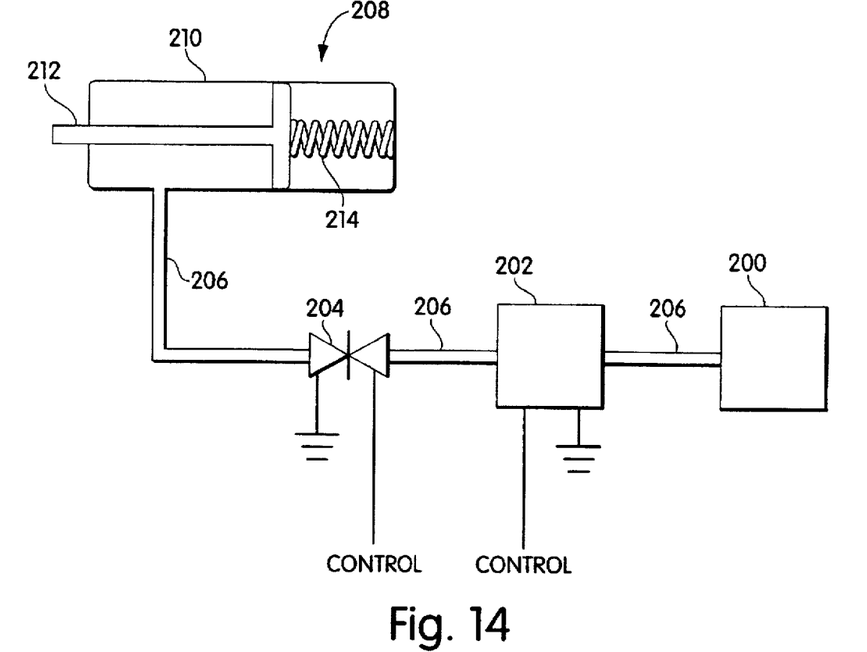
FIG. 14 is a schematic diagram of the hydraulic power source.

The Power Source of FIG. 14

In the preferred embodiment, where the lowering of the body is performed by hydraulic cylinders, the power source is a source of pressurized hydraulic fluid. As in FIG. 14, this source includes a hydraulic fluid reservoir 200, a hydraulic pump 202, a normally open hydraulic valve 204, and hydraulic lines 206 connecting the reservoir 200, pump 202, valve 204, and hydraulic cylinders 208. When the body lowering system is in its inoperative condition, the valve 204 is open and the fluid is stored in the reservoir 200. When the system is energized and is in transition from its inoperative condition to its operative condition, the pump 202 is activated to force fluid through the open valve 204 from the reservoir 200 into the hydraulic cylinder 208 via the hydraulic lines 206, causing the cylinder piston 212 to retract into the cylinder shell 210. When the system reaches its operative condition, the pump 202 is deactivated and the valve 204 is closed in order to maintain fluid pressure to keep the piston 212 retracted into the shell 210.

When the system is deenergized, the valve 204 is opened and the action of the vehicle suspension system 16 returning to its normal position forces the hydraulic fluid back into the reservoir 200, returning the piston 212 to its quiescent extended state. Alternatively, when the system is deenergized, the valve 204 is opened and a biasing mechanism internal to the cylinder 214, for example, a spring, forces the piston 212 to return to its quiescent extended state.

Figure 15:
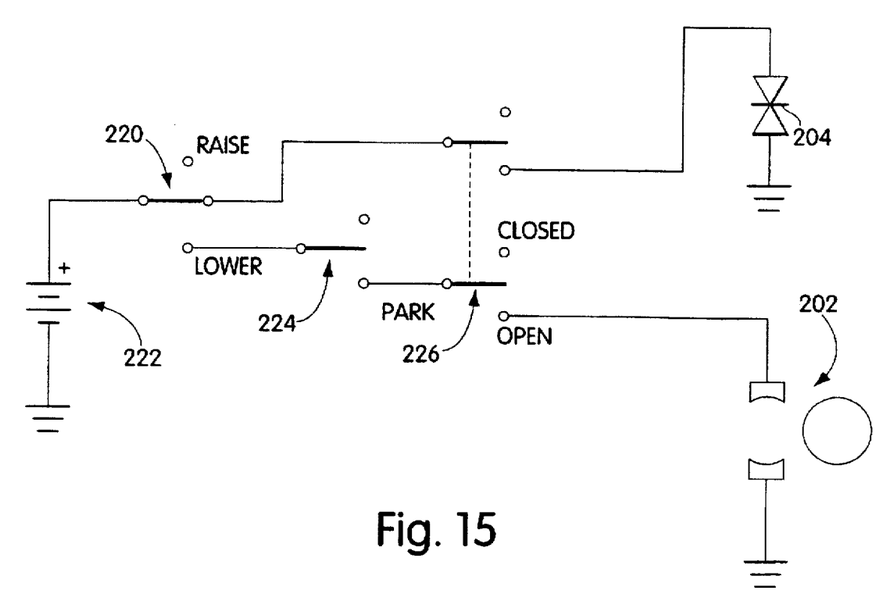
FIG. 15 is an electrical schematic of the control circuitry.

The Manually Actuated Control of FIG. 15

An electrical schematic of the manually actuated control is shown in FIG. 15. The control includes a manually actuated electrical switch 220 and control circuitry. In one embodiment, the manually actuated switch 220 is directly connected to the control circuitry and located inside the body 14 in close proximity to the door 20. In another embodiment, the manual switch 220 is a remote control device, with the physical switch located on a remote transmitter held by the operator and a receiver located in the vehicle and directly wired to the control circuitry.

The vehicle battery 222 supplies electrical power to the hydraulic pump 202 and hydraulic valve 204 through a number of electrical switches. The valve 204 is only closed when the door 20 is open and the manual switch 220 is in its center position. The pump 202 is on only when the manual switch 220 is in its down or "lower" position and any number of safety switches are active. Examples of two safety switches are shown in the schematic as the transmission switch 224 and the door switch 226. In this example, the transmission must be in "park" (which may also include "neutral") and the door must be open to enable the pump 202.

The manual switch 220 is a momentary contact switch, which means that the manual switch 220 must be manually held in the "lower" position continuously during the transition from the inoperative condition to the operative condition. If the switch 220 is released before reaching the operative position, the pump 202 is deactivated, causing the system to maintain the position it was in when the manual switch 220 was released.

Another condition to energizing the system in this example is that the automatic transmission of the vehicle be in the "park" position. If the transmission is not in "park", as determined by switch 224, the system will not energize. If the transmission is removed from "park" during the transition from the inoperative condition to the operative condition, the pump 202 is deactivated, but the valve 204 remains deactivated, causing the system to return to the inoperative position.

The last condition to energizing the system in this example is that the door is open. If the door is not open, as determined by switch 226, neither the pump 202 nor the valve 204 will be energized. If the door is closed during the transition from the inoperative condition to the operative condition, the pump 202 is deactivated and the valve 204 is opened, causing the system to deenergize and return to the inoperative condition. Preferably, this condition is only installed in vehicles using the present invention for allowing disabled persons to embark and debark, not for vehicles using the present invention for loading and unloading cargo.

The center position of the manual switch 220 activates the valve 204 if the door is open.

When the manual switch 220 is held in the upper or "raise" position, the valve 204 is deactivated, allowing the fluid to return the reservoir 200 and causing the system to return to its inoperative condition.

OPERATION

Figure 16:
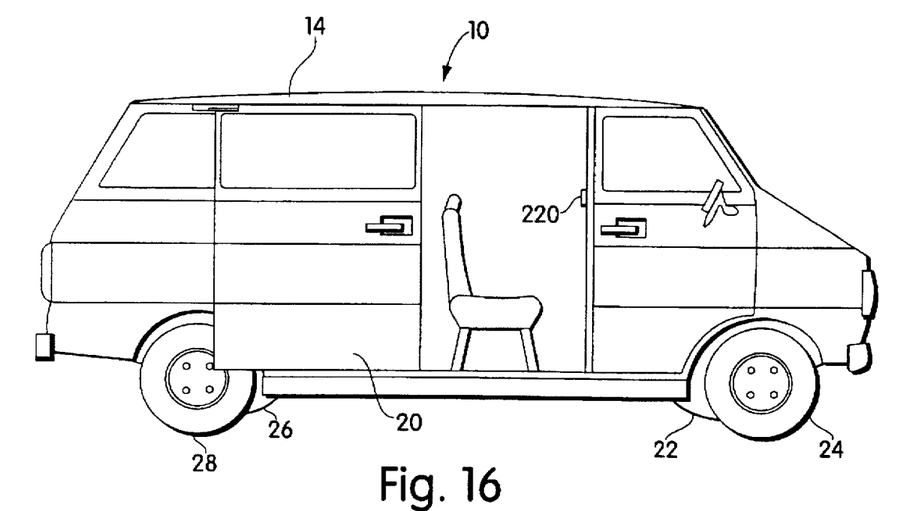
FIG. 16 is a profile of the vehicle of FIG. 1 with the present invention in its inoperative condition.
Figure 17:
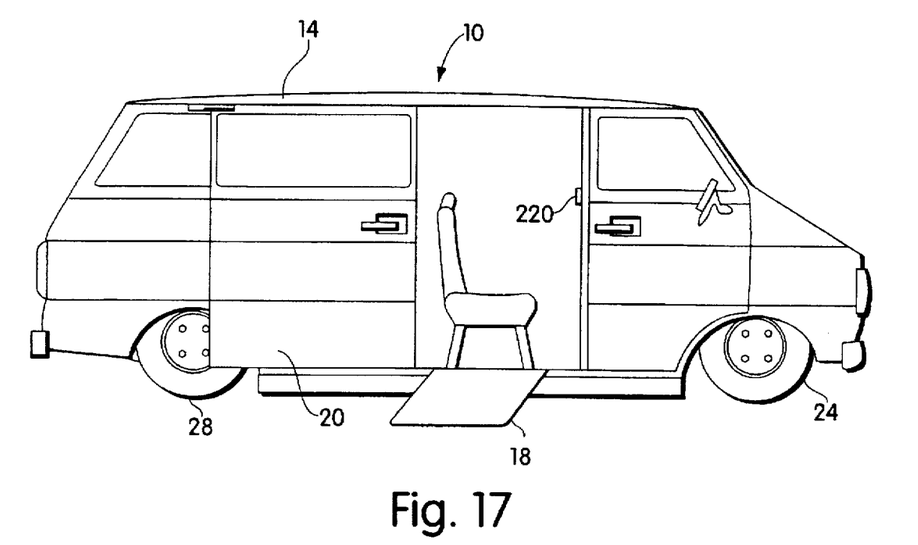
FIG. 17 is a profile of the vehicle of FIG. 1 with the present invention in its operative condition.

The operation of the present invention configured to allow a disabled person to embark or debark is illustrated in FIGS. 16 and 17. To operate the present invention, the operator presses and holds the manually actuated switch 220 in the down or "lower" position. The system of the present invention energizes, compressing the suspension system 16 of the vehicle 10, causing the vehicle body 14 to lower toward the ground. If the disabled person wishing to embark or debark does not require the vehicle body 14 to be lower to the ground, the person embarks or debarks. If the person wishing to embark or debark is still unable to do so with the suspension system 16 fully compressed, a ramp 18 is extended from the door 20 for addition assistance in embarking or debarking.

When the operator wishes to return the vehicle to its normal operating condition, the operator presses and holds the manually actuated switch 220 in the up or "raise" position. The system of the present invention deenergizes, causing the suspension system 16 to return to it normal condition.

What is claimed is:

1. In a motor vehicle having a carriage including at least one axle and an axle housing, a load compartment body having a floor, and a spring suspension component at each of said axles for the buoyant support of said body above said carriage between a lower position and an upper position, an assembly for facilitating ingress and egress of a load from said motor vehicle, said assembly comprising:

(a) a hydraulic cylinder having a shell and a piston extending from a first end of said shell, said shell being mounted within said body;

(b) a power source;

(c) a manually actuated control for energizing and deenergizing said power source;

(d) a flexible, substantially constant length line connected at one end to an end of said piston, extending through an opening in said body floor, and attached to said axle housing such that, when said power source is deenergized, said vehicle body is freely subject to said buoyant support; and (e) whereby, when said assembly is activated, said piston retracts into said shell, pulling said line, and causing said spring suspension component to compress, thus lowering said vehicle body at said axle.

2. The assembly of claim 1 wherein said cylinder is oriented approximately horizontally.

3. The assembly of claim 1 wherein said opening is located approximately above said axle housing, a pulley is mounted in said body and above said opening, and said line is directed by said pulley.

4. The assembly of claim 3 wherein said line is a link chain.

5. The assembly of claim 4 wherein said pulley is a toothed sprocket.

6. The assembly of claim 1 wherein said line is attached to said axle housing via a rigid bar fixedly attached to said axle housing.

7. The assembly of claim 1 wherein the pulling power of said cylinder is at least the amount of power necessary to fully compress said spring suspension component.

8. The assembly of claim 1 wherein said line has a length such that said line is nearly fully extended when said cylinder and said spring suspension component are fully extended, and the displacement of said cylinder is at least long enough to fully compress said spring suspension component.

9. In a motor vehicle having a carriage including at least one axle and an axle housing, a load compartment body having a floor, and a spring suspension component at each of said axles for the buoyant support of said body above said carriage between a lower position and an upper position, an assembly for facilitating ingress and egress of a load from said motor vehicle, said assembly comprising:

(a) a hydraulic cylinder having a shell and a piston extending from a first end of said shell, said shell being mounted approximately horizontally within said body;

(b) a power source;

(c) a manually actuated control for energizing and deenergizing said power source;

(d) a toothed sprocket mounted within said body above an opening in said body floor approximately above said axle housing;

(e) a link chain connected at one end to an end of said piston, directed by said sprocket through said opening, and attached to said axle housing such that, when said power source is deenergized, said vehicle body is freely subject to said buoyant support;

(f) said chain having a length such that said chain is nearly fully extended when said cylinder and said spring suspension component are fully extended, and the displacement of said cylinder is at least long enough to fully compress said spring suspension component;

(g) the pulling power of said cylinder being at least the amount of power necessary to fully compress said spring suspension component; and (h) whereby, when said assembly is activated, said piston retracts into said shell, pulling said chain, and causing said spring suspension component to compress, thus lowering said vehicle body at said axle.

10. In a motor vehicle having a carriage including at least one axle having a wheel at each end, an axle housing, a load compartment body having a floor, and a spring suspension component at each of said wheels for the buoyant support of said body above said carriage between a lower position and an upper position, an assembly for facilitating ingress and egress of a load from said motor vehicle, said assembly comprising:

(a) at least one hydraulic cylinder having a shell and a piston extending from a first end of said shell, said shell being mounted approximately horizontally within said body;

(b) a power source;

(c) a manually actuated control for energizing and deenergizing said power source;

(d) a pulley mounted within said body above an opening in said body floor approximately above said axle housing;

(e) a flexible, substantially constant length line connected at one end to an end of said piston, directed by said pulley through said opening in said body floor, and attached to said axle housing such that, when said power source is deenergized, said vehicle body is freely subject to said buoyant support; and (f) whereby, when said assembly is activated, said piston retracts into said shell, pulling said line, and causing said spring suspension component to compress, thus lowering said vehicle body at said axle.

11. The assembly of claim 10 wherein there are two cylinders and two lines.

12. The assembly of claim 11 wherein said two lines are attached to said axle housing via a rigid bar fixedly attached to said axle housing near each of said wheels.

13. The assembly of claim 12 wherein said two cylinders are parallel to and in close proximity to each other and are approximately perpendicular to said axle housing.

14. The assembly of claim 12 wherein said lines are link chains and said pulleys are toothed sprockets.

15. In a motor vehicle having a carriage including at least one axle and an axle housing, a load compartment body having a floor, and a spring suspension component at each of said axles for the buoyant support of said body above said carriage between a lower position and an upper position, an assembly for facilitating ingress and egress of a load from said motor vehicle, comprising:

(a) a hydraulic cylinder having a shell and a piston extending from a first end of said shell, said cylinder being slidably mounted within said body;

(b) a power source;

(c) a manually actuated control for energizing and deenergizing said power source;

(d) a first pulley mounted within said body above a first opening in said body floor approximately above said axle housing;

(e) a second pulley mounted within said body above a second opening in said body floor approximately above said axle housing;

(f) a first flexible, substantially constant length line connected at one end to an end of said piston, directed by said first pulley through said first opening, and attached to said axle housing approximately below said first opening such that, when said power source is deenergized, said vehicle body is freely subject to said buoyant support;

(g) a second flexible, substantially constant length line connected at one end to a second end of said shell, directed by said second pulley through said second opening, and attached to said axle housing approximately below said second opening such that, when said power source is deenergized, said vehicle body is freely subject to said buoyant support; and (h) whereby, when said assembly is activated, said piston retracts into said shell, pulling said lines, and causing said spring suspension components to compress, thus lowering said vehicle body at said axle.

16. The assembly of claim 15 wherein said lines are a link chains.

17. The assembly of claim 16 wherein said pulleys are toothed sprockets.

18. The assembly of claim 15 wherein the pulling power of said cylinder is at least the amount of power necessary to fully compress said spring suspension components.

19. The assembly of claim 15 wherein said lines have a length such that said lines are nearly fully extended when said cylinder and said spring suspension components are fully extended, and the displacement of said cylinder is at least long enough to fully compress said spring suspension components.

20. In a motor vehicle having a carriage including at least one axle and an axle housing, a load compartment body having a floor, and a spring suspension component at each of said axles for the buoyant support of said body above said carriage between a lower position and an upper position, an assembly for facilitating ingress and egress of a load from said motor vehicle, comprising:

(a) a hydraulic cylinder having a shell and a piston extending from a first end of said shell, said cylinder being slidably mounted within said body;

(b) a power source;

(c) a manually actuated control for energizing and deenergizing said power source;

(d) a first toothed sprocket mounted within said body above a first opening in said body floor approximately above said axle housing;

(e) a second toothed sprocket mounted within said body above a second opening in said body floor approximately above said axle housing;

(f) a first link chain connected at one end to an end of said piston, directed by said first sprocket through said first opening, and attached to said axle housing approximately below said first opening such that, when said power source is deenergized, said vehicle body is freely subject to said buoyant support;

(g) a second link chain connected at one end to a second end of said shell, directed by said second sprocket through said second opening, and attached to said axle housing approximately below said second opening such that, when said power source is deenergized, said vehicle body is freely subject to said buoyant support;

(h) said first and second chains having a length such that said chains are nearly fully extended when said cylinder and said spring suspension component are fully extended, and the displacement of said cylinder is at least long enough to fully compress said spring suspension components;

(i) the pulling power of said cylinder being at least the amount of power necessary to fully compress said spring suspension components; and (j) whereby, when said assembly is activated, said piston retracts into said shell, pulling said chains, and causing said spring suspension components to compress, thus lowering said vehicle body at said axle.

* * * * *